United States Patent [19]
Calo et al.

[11] Patent Number: 5,988,395
[45] Date of Patent: Nov. 23, 1999

[54] LIQUID-FLUIDIZED BED CLASSIFIER (LFBC) FOR SORTING WASTE PLASTICS AND OTHER SOLID WASTE MATERIALS FOR RECYCLING

[76] Inventors: Joseph M. Calo, 16 Hawthorne Rd., Greenville, R.I. 02828; Eric M. Suuberg, 98 Ferry La., Barrington, R.I. 02806

[21] Appl. No.: 08/426,877

[22] Filed: Apr. 24, 1995

[51] Int. Cl.⁶ .................. B03B 1/00; B03B 5/52
[52] U.S. Cl. .................. 209/3; 209/4; 209/11; 209/172.5; 209/454; 209/500
[58] Field of Search .................. 209/3, 4, 11, 155, 209/158, 172, 172.5, 173, 930, 932, 454, 458, 459, 483, 500

[56] References Cited

U.S. PATENT DOCUMENTS

| | | | |
|---|---|---|---|
| 2,746,603 | 5/1956 | Blondellle | 209/172.5 |
| 4,111,798 | 9/1978 | Peterson et al. | 209/172 X |
| 4,119,533 | 10/1978 | Saitoh et al. | 209/155 |
| 4,194,926 | 3/1980 | Barnsbee | 209/11 X |
| 4,264,439 | 4/1981 | Lefevre et al. | 209/454 |
| 4,617,111 | 10/1986 | Grimm et al. | 209/4 |
| 4,830,188 | 5/1989 | Hannigan et al. | 209/3 |
| 4,981,876 | 1/1991 | Grimmer | 521/46.5 |
| 5,126,058 | 6/1992 | Beckman | 209/172 X |
| 5,397,066 | 3/1995 | Leitman et al. | 209/4 X |

FOREIGN PATENT DOCUMENTS 2 078 138   1/1982   United Kingdom .

OTHER PUBLICATIONS

"Mixing of Particles in Liquid Fluidised Beds", P. Van Der Meer et al., Chem. Eng. Res. Des., vol. 62, Jul. 1984, pp. 214–222.

"Particle Mixing and Classification in Liquid Fluidised Beds", M. R. Al–Dibouni et al., Trans. IChemE, vol. 57, 1979, pp. 94–103.

*Primary Examiner*—Tuan N. Nguyen

[57] ABSTRACT

Disclosed herein is a method and system for sorting recycled solid waste materials, such as plastics, by a liquid-fluidized bed classifier (LFBC) technique. The application of a LFBC to the separation of plastics, and in particular plastic particles, is shown to be advantageous for a number of reasons. Firstly, the primary fluidization medium, i.e., water, is present in large quantities during conventional chopping, washing, and flotation operations that are performed during plastics recycling operations. Secondly, the natural density distribution of the major types of recycled plastics favors segregation by density in water, i.e., the "lighter-than-water" polyolefins, polypropylene (PP) and polyethylene (PE) from the "heavier-than-water" polystyrene (PS) PVC and PET plastics. The latter types of plastics have been found to separate spatially in an upflow LFBC, while the "lighter-than-water" plastics can be collected at the top of the column, thereby combining flotation and classification in a single step. Further separation of the polyolefins can be accomplished in a second LFBC operating in a downflow mode. Thirdly, any overlap of density distributions between types of plastics is overcome via selective modification of plastic particle size/density. A fourth advantage of the LFBC spatial separation is that the separated plastic particles can be collected by hydraulic flow from the appropriate section of the column and supplied to simple gravity separators for particle recovery, and also for disengaging the fluidizing water for recycling, thereby enabling the continuous classification of plastic particles with both continuous feed and product removal.

29 Claims, 6 Drawing Sheets

LIQUID-FLUIDIZED BED CLASSIFIER (LFBC) FOR SORTING WASTE PLASTICS AND OTHER SOLID WASTE MATERIALS FOR RECYCLING

FIELD OF THE INVENTION

This invention relates generally to systems and methods for separating solid particulate materials and, in particular, to the use of liquid-fluidized beds for separating and classifying solid objects.

BACKGROUND OF THE INVENTION

Due in part to more stringent regulations on soil and water contamination and on landfill capacity, the number of landfill sites available for accepting solid waste is steadily decreasing, while the amount of municipal solid waste (MSW) is steadily increasing. This has placed increasing pressure on developing efficient methods for the recycling and reclamation of solid wastes.

On a volume basis, it has been estimated that waste paper accounts for about 34%, metals 12%, yard waste 10%, glass and food 2–3%, and plastics from 10–20% of the MSW stream, and as a category, packaging materials account for about 30% of MSW volume (8% plastics, 14% paper, and 8% metals, glass, etc.). The total amount of plastics in the MSW stream in the U.S. is projected to increase to 15.6 million tons per year, or 9.2% by weight by the year 2000. And, although many would consider bottle recycling programs as a success, these operations have barely "scratched the surface" of the ultimate potential for plastics recycling. Plastics still represent the least recycled of all packaging materials at a total recovery rate of about 1%. In addition, the recovery of engineered thermoplastics from durable goods, such as automobiles and computers, has been identified as an important goal in recycling. As an example of the magnitude of this problem, 21.9 billion tons of waste plastics from durable goods were generated in the U.S. in 1992, and this amount is projected to increase 4.6% annually.

Alternatives to recycling are also being considered, such as depolymerization, and pyrolysis or combustion of plastic wastes. However, it has been clearly shown that recycling is by far the most energy efficient route. For example, the fraction of the "embodied energy" (i.e. the energy required to manufacture a polymer product) recovered for recycling to replace virgin polymer applications is 80–95%; which decreases sharply to 15–40% for recovery of thermal energy from waste plastics.

Superimposed on this steadily growing need for plastics recycling is the problem that recovery costs typically exceed the market price of recycled plastics. As a result of this disparity, many commercial recyclers are seeking to either cut-back or completely eliminate the recycling of plastics. In order to counter this trend, it is imperative that new, more cost-effective separation/recycling processes for plastic waste must be developed and implemented.

An important aspect of any cost-effective plastics reclamation system is an ability to effectively classify and segregate the various types of plastics that appear in a typical waste stream.

OBJECTS OF THE INVENTION

It is a first object of this invention to provide a cost effective and efficient method and system for reclaiming plastic material from waste streams.

It is a second object of this invention to provide a cost effective and efficient method and system for segregating and separating waste materials, such as plastics and plastics and metals.

SUMMARY OF THE INVENTION

The foregoing and other problems are overcome and the objects of the invention are realized by a method and system for sorting recycled plastics by a liquid-fluidized bed classification (LFBC) technique. The application of a LFBC to the separation of plastics, and in particular plastic particles, is advantageous for a number of reasons.

Firstly, the primary fluidization medium, i.e., water, is present in large quantities during conventional chopping, washing, and flotation operations that are performed during plastics recycling operations.

Secondly, the natural density distribution of the major types of recycled plastics favors segregation by density in water, i.e., the "lighter-than-water" polyolefins, polypropylene (PP) and polyethylene (PE) from the "heavier-than-water" polystyrene (PS) PVC and PET plastics. The latter types of plastics have been found to separate spatially in an upflow LFBC, while the "lighter-than-water" plastics can be collected at the top of the column, thereby combining flotation and classification in a single step. Further separation of the polyolefins can be accomplished in a second LFBC operating in a downflow mode, still using water as the fluidizing liquid.

Thirdly, an overlap of density distributions between types of plastics is reduced or eliminated by selective modification of plastic particle size/density.

A fourth advantage of the LFBC spatial separation approach taught by this invention is that the separated plastic particles can be collected by hydraulic flow from the appropriate section of the column and supplied to simple gravity separators for particle recovery, and also for disengaging the fluidizing water for recycling, thereby enabling the continuous or semi-continuous classification of plastic particles with both continuous feed and product removal.

In accordance with an aspect of this invention there is provided a system and method for separating heterogeneous solid plastic waste material into at least two substantially homogeneous fractions, each comprising substantially only one type of plastic. The method includes the steps of (a) providing the solid plastic waste material in a particulate form; (b) loading the provided solid plastic waste material into a column of a liquid-fluidized bed classifier (LFBC); and (c) pumping a flow of liquid through the column for separating the solid plastic waste particulates into at least two fractions based in part on the densities of the different types of plastics that comprise the solid plastic waste material.

The particulates of each of the types of plastics have a size/density distribution, and for the case where there is an overlap of size/density distributions between the particulates of at least two of the types of plastics, the method further includes a step of modifying the size/density distribution of the particulates of at least one of the types of plastics so as to reduce or eliminate the overlap. The step of modifying can be accomplished, by example, by (a) varying a temperature of the fluidizing medium to change a size of the particulates of one of the types of plastics relative to the particulates of another type of plastic, (b) through the use of an additive such as solvent that selectively swells (enlarges) the particulates of at least one type of plastic, or (c) by a combination of temperature variation and additive(s).

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Although the teaching of this invention is described herein in the context of plastics separations applications, it should be realized that the teaching of this invention is not limited for use only with plastics. Other solid wastes, and combinations of various types of solid wastes, can be similarly processed by LFBC in accordance with this invention, such as, by example, glass and metals. The relatively higher specific gravities of these materials enable their separation from plastics, and from each other, by "coarse" separation in a primary LFBC, followed by finer separations in secondary LFBCs operating on the resultant fractions to produce more purified "sub-fractions" (e.g. see FIG. 7). Thus, although the ensuing description of the invention is made in the context of various types of plastics, it should be kept in mind that other types of waste materials can also be similarly treated.

This invention flows from an understanding of the applicants that, under liquid-fluidized conditions, particles segregate according to their size and density. For particles denser than the fluidizing medium, the lighter/smaller particles accumulate near the top of the fluidized bed, and the heavier/larger particles populate the bottom of the bed. This principle is known to have been applied in other applications, such as "jigs" used in mineral dressing and coal beneficiation, industrial suspended bed crystallizers, and expanded bed adsorbers. This principle has also been applied to biomass conversion in water-fluidized beds.

This invention provides a novel application of this and other principles to the classification and separation of waste plastic particles, chips and flakes, all referred to herein generally as particulates, for recycling, and is described below in the context of several examples.

Figure 1A:
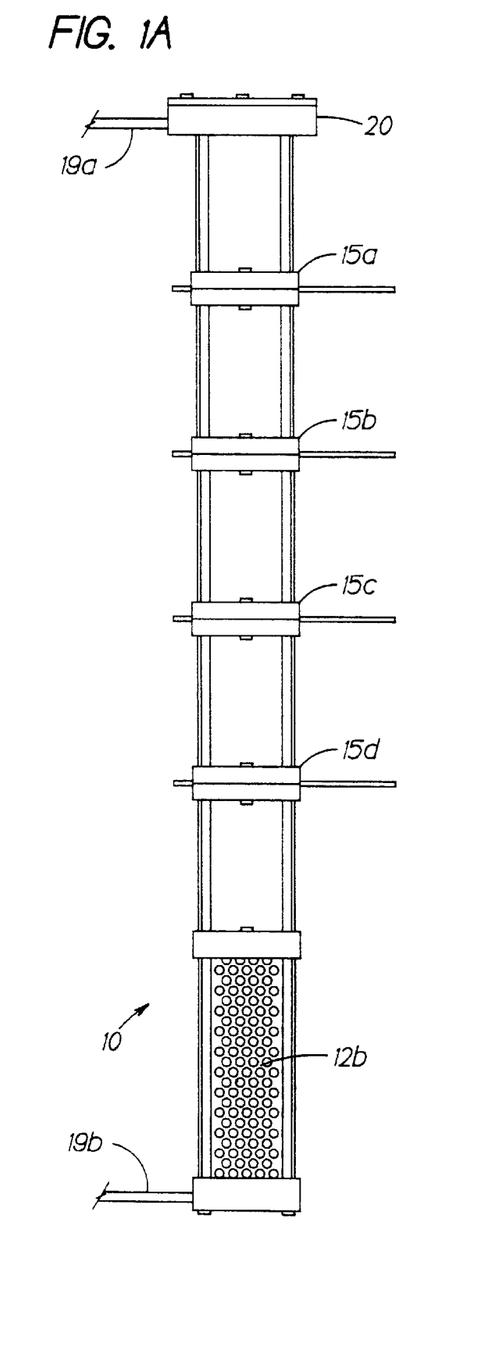
FIG. 1A is a side view of an exemplary vertical Liquid-Fluidized Bed Classifier (LFBC) suitable for practicing this invention.
Figure 1B:
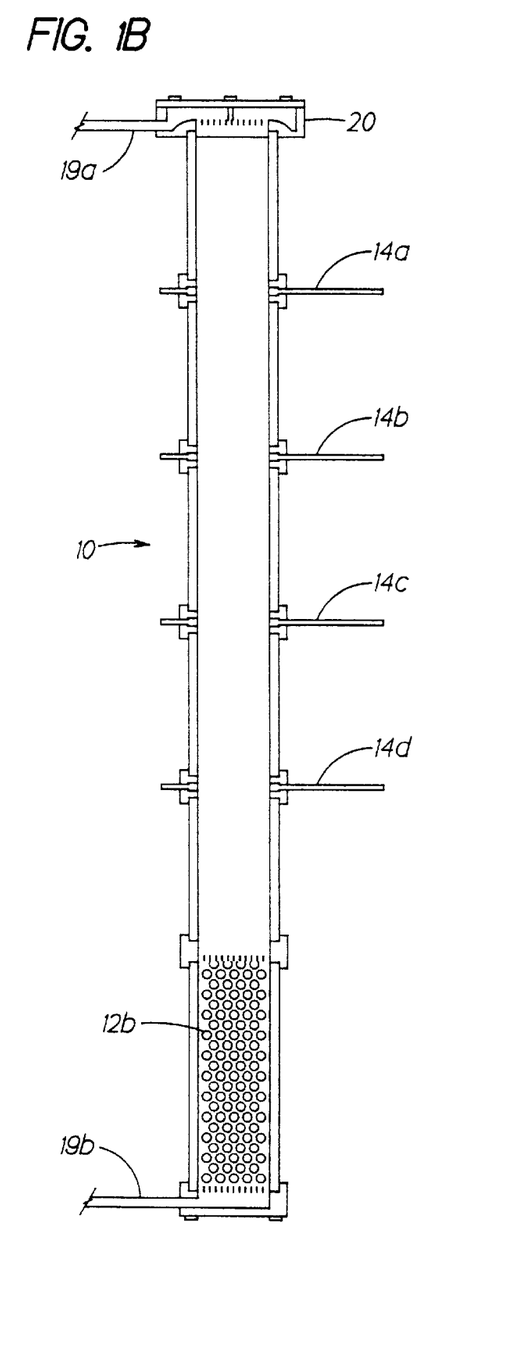
FIG. 1B is a cross-sectional view of the LFBC of FIG. 1A.
Figure 1C:
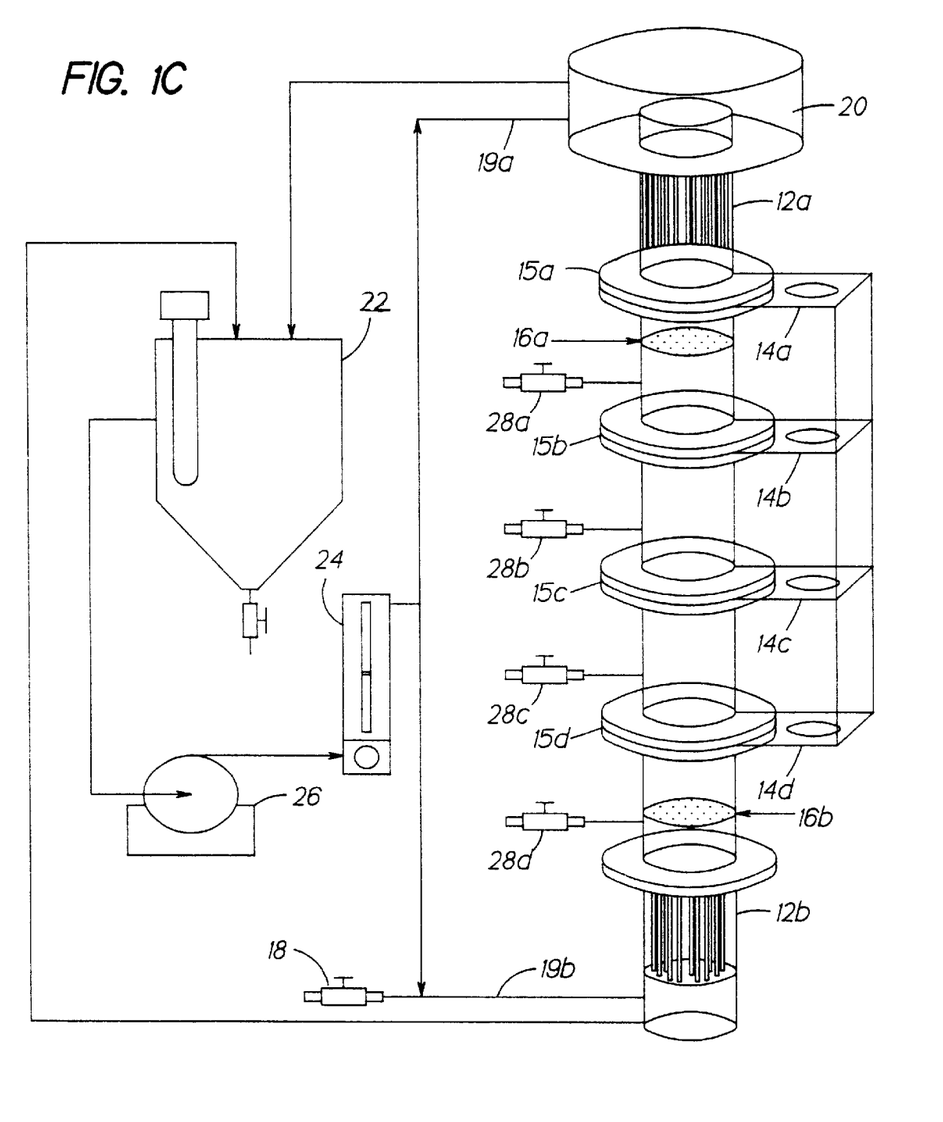
FIG. 1C is a simplified diagram of a vertical LFBC plastics classifier and sorter system in accordance with this invention.

Referring first to FIGS. 1A, 1B, and 1C, there is illustrated a pilot-scale, 10 cm diameter, liquid-fluidized column 10. The column 10 has a height of approximately 87 inches and includes upper and lower removable homogenizing/distributor sections 12a and 12b, a plurality of column section isolation slide assemblies 14a–14d and associated flanges 15a–15d, and, upper (downflow) and lower (upflow) distributors 16a and 16b, respectively. A valve 18 connects a water flow via water conduits 19a and 19b to a top-mounted disengaging tank 20 and to the lower homogenizing/distributor 12b. Other external system components (external to the column 10) include one or more thermostated tanks 22 (useful for varying the temperature of the fluidizing medium as described below), a flow control meter 24, and a fluidization/recirculating pump 26. A plurality of sampling ball valves 28a–28d are provided between the isolation slide assemblies 14 and between the upper and lower distributors 16a, 16b and their adjacent slide assemblies 14a and 14b. Separated plastic particles can be selectively extracted through the valves 28, and/or a mixture of plastic particles to be separated can be introduced into the column 10 through one or more of the valves 28.

As was indicated above, FIGS. 1A–1C illustrate a 10 cm diameter pilot scale liquid-fluidized bed classifier. It should be noted that the ensuing Examples are given in the context of a proportionately smaller, 5 cm diameter laboratory-scale liquid-fluidized bed classifier that, other than having a smaller size, operates in the same manner as the LFBC 10 of FIGS. 1A–1C. As such, the 5 cm diameter LFBC will hereafter be referred to as the LFBC 10' or as the column 10'.

EXAMPLE 1

A binary mixture, prepared from 22 cc of PS barrels and 200 cc of PET flakes (~425 cc bulk volume; see Table I for particle properties; the amounts listed are for the ternary mixture run described below), was charged to the column 10' as a fixed bed supported by the distributor 16b. The originally clear PS particles were stained turquoise with indelible ink to facilitate the observation of these particles. The particles were sieved (6–12 mesh) to improve size uniformity. The pump 26 was started at low speed, and the resulting upflow of water through the distributor 16b caused the plastics mixture to rise slowly in the column 10' as a "plug." Particles "rained-out" of the bottom of the plug as it rose, until it broke up. PET flakes were observed to sink, while PS particles moved upward. The speed of the pump 26 was then increased to its maximum (~2 gpm in this example), and in less than a minute the plastics mixture was observed to be totally segregated, with the PS particles completely fluidized at the top, and the PET flakes fluidized at the bottom of the column 10'. The water flow was then reduced, and the fluidized bed allowed to collapse to a fixed bed in which the two plastics remained completely segregated.

TABLE I

PLASTIC PARTICLE CHARACTERISTICS

| Plastic Type | Polystyrene (PS) | Polycarbonate (PC) | Polyvinylchloride (PVC) |
| --- | --- | --- | --- |
| Specific Gravity | 1.05 | 1.20 | 1.33 |
| Color | Turquoise | Clear | Black |
| Particle Size | 6–12 mesh | 6–12 mesh | 6–12 mesh |
| Particle Shape | Oblate cylinders | Oblate Cylinders | Irregular Chips |
| Nominal Size | ~2.5 mm dia. x 5 mm) | ~2.5 mm dia. x 5 mm | ~1/32" x 1/8" |
| Charged Mass (g) | 75 | 75 | 150 |
| # Particles | 4605 | 4658 | 19710 |
| Dry Bulk Volume (cc) | 115 | 101 | 238 |

EXAMPLE 2

Figure 2:
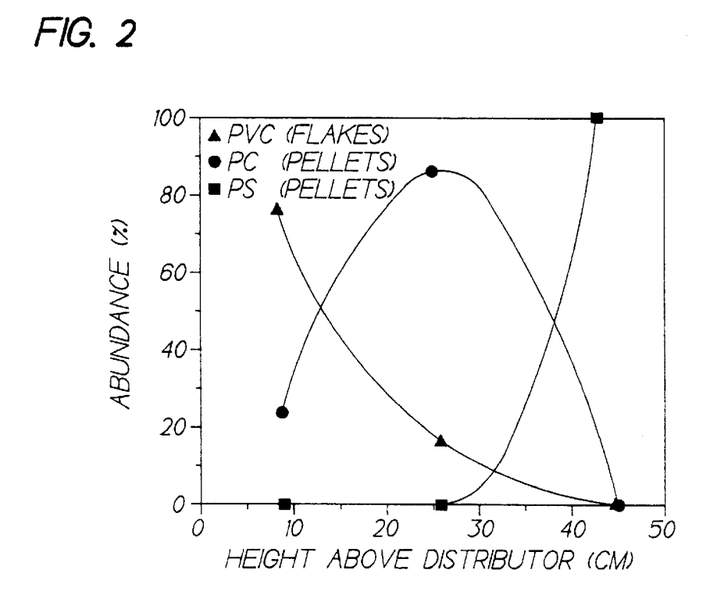
FIG. 2 is a graph showing a separation of three plastics in an LFBC that is similar to the LFBC of FIGS. 1A–1C.

A ternary PS/PC/PVC mixture (see Table I for particle properties) was tested in the same column 10'. All the particles were sieved (6–12 mesh). The experimental procedures were similar to those described above. Particle samples were taken, via the sampling ball valves 28 that are spaced along the column length, at steady-state at the highest flow rate achievable. Particle concentrations were obtained by "hand-sorting" and counting the different colored particles. These results are illustrated in FIG. 2. It is noted that even though the experimental conditions were far from optimum for maximum separation performance, due to apparatus shortcomings (i.e., the liquid flow rate was insufficient to fully fluidize the PVC fraction), segregation of the three plastic types was quite apparent.

These results indicate that for plastics that differ sufficiently in density, the issues of particle size distribution and shape are somewhat secondary, as long as the particles are approximately the same size. This is because particle classification is governed primarily by the Galileo (or Archimedes) number. The relative sensitivity of the Galileo number to the equivalent particle diameter, d, is 3, whereas the relative sensitivity of the Galileo number to the particle density, $\rho$, is 30. Consequently, the Galileo number, and equivalently, the separability of the particles, is much more sensitive to density than to size.

EXAMPLE 3

Experiments were performed in the column 10' on an initially completely mixed sample of approximately 100 cc each of the same PS (turquoise) and PC (clear) particles listed in Table I above. Fluidization of the particles at a superficial liquid velocity of 0.7 cm/s was found to be accompanied by almost immediate separation of the two plastic types, with the lighter PS at the top, and the heavier PC at the bottom of the column 10'. The PS fraction was completely removed hydraulically while the bed remained fluidized. It is noted that the bottom PC can be drawn off in the same manner. Separation of this binary mixture can be readily conducted in a continuous manner at steady-state in the fluidized column 10' by continuously feeding the mixture through one of the valves 28 at the interface between the two segregated fluidized plastic types, and continuously withdrawing substantially pure fractions through valves 28 located above and below the feed point.

The previous three Examples clearly demonstrate that the LFBC system of this invention provides for the separation of different types of initially mixed waste plastic particulates.

In order to further demonstrate the process of this invention, a numerical model was developed to estimate the separation performance that can be achieved in the LFBC for other mixtures of plastics. The model allows for solid phase dispersion or mixing among particles of different plastic types and densities throughout the bed.

Figure 3:
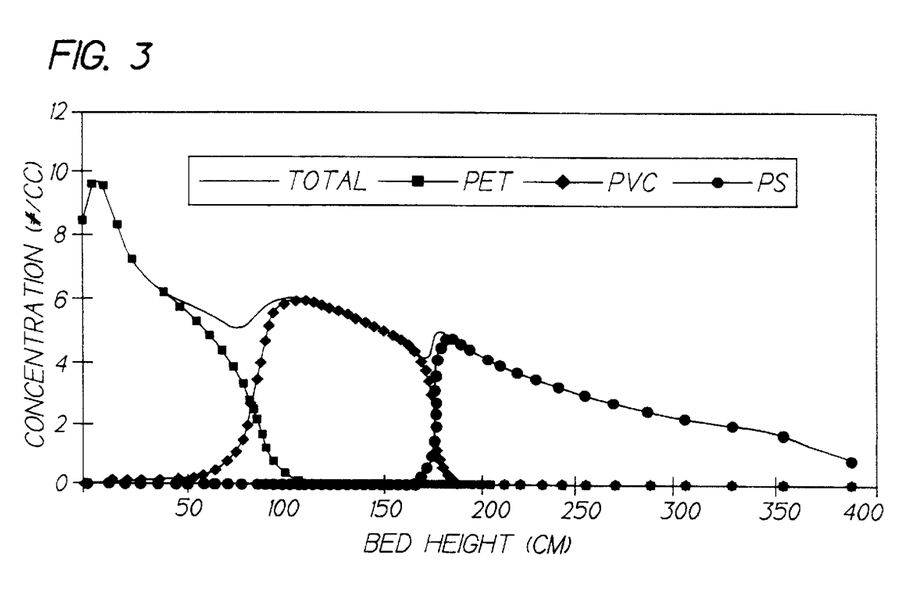
FIG. 3 is a graph showing the result of a numerical model that predicts LFBC performance and, in particular, depicts steady-state plastic particle profiles in an "upflow" configuration.

Gaussian density distributions were assumed for three, "heavier-than-water" recyclable plastic types: PS, PVC, and PET, with mean specific gravities of 1.05, 1.25, and 1.35, and variances of 0.04, 0.04, and 0.02, respectively. The arbitrary number of particles selected was one million of each type. All the particles were assumed to be sieved to the same size, with an "equivalent spherical diameter" of 0.5 cm. Of course, in practice the actual waste plastic particles will typically not be spherical in shape. The bed or column 10 diameter was arbitrarily set to 50 cm. A value of 1 $cm^2/s$ was assumed for the dispersion coefficient. The results of the model calculation are presented in FIG. 3 for a superficial liquid velocity of 5 cm/s. As is shown the three plastic types are separated in height in the fluidized bed. Although there is overlap between the plastic types due to the assumed density distributions, there are also clearly identifiable regions where the particle fractions are substantially pure. The regions of high concentration of a particular particle type can be expanded (within limits) by increasing the fluidization velocity.

Figure 4:
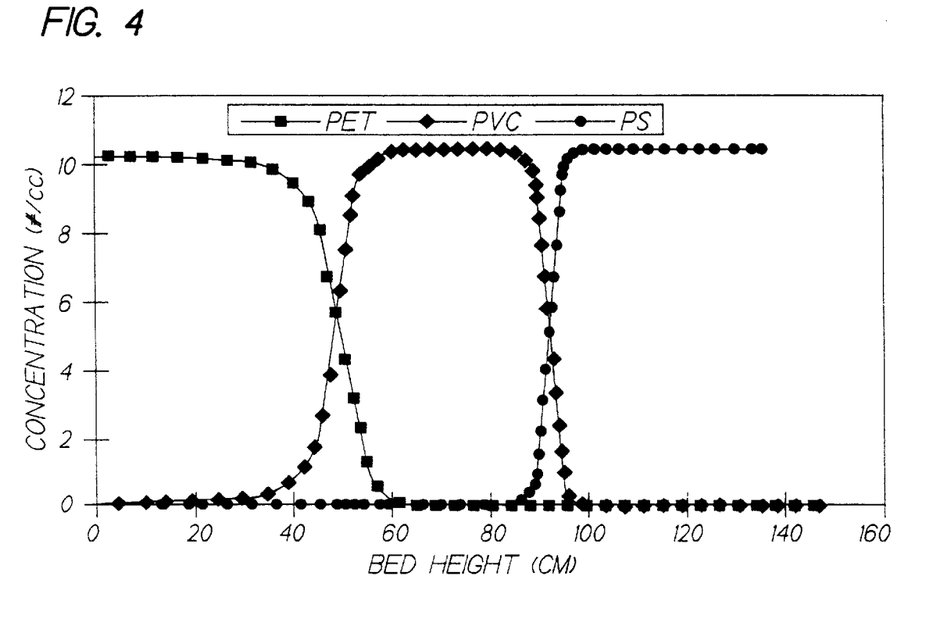
FIG. 4 is a graph showing the result of the numerical model that predicts LFBC performance and, in particular, depicts particle concentration profiles in a fixed bed following the fluidization in FIG. 3.

Energy costs for running the LFBC are a factor in determining overall process economics. However, it has been shown in Example 1 that continuous fluidization is not necessary once particle segregation has been achieved. In other words, the bed may be periodically fluidized, that is "pulse-fluidized", to produce the desired classification, and then allowed to "slump" to a fixed bed. The 4 m fluidized bed in FIG. 3 collapses to a fixed bed of about 1.5 m, as shown in FIG. 4. The classified particles can then be physically removed from their respective regions of the column.

The "lighter-than-water" polyolefins will collect at the top of an upflow LFBC, and can be skimmed or hydraulically removed from the bed. This fraction can then be separated further according to density in another LFBC operating in a downflow mode, with the liquid distributor 16a located at the top of the LFBC, and the fluidizing water flowing down through the bed. In this mode of operation the lighter, more buoyant particles accumulate at the top of the bed near the distributor 16a, and the heavier particles accumulate further down the bed.

The basic concept for the downflow LFBC is the same as for the upflow LFBC, and the same model can be applied to this mode of operation as well. Gaussian density distributions were assumed for the "lighter-than-water" plastic types PP, LDPE, and HDPE, with mean specific gravities of 0.905, 0.918, and 0.952, and variances of 0.005, 0.005 and 0.112, respectively. As before, one million particles of each type of plastic were assumed. Results for operation at 80° C. (the temperature is relevant to the calculation presented below) and a velocity of 1.5 cm/s, with a value of 0.5 $cm^2/s$ assumed for the dispersion coefficient, for a 50 cm diameter column, are presented in FIG. 5. As is shown, good separation is achieved between the PP and HDPE particles (an important separation problem for recycled plastics), while there is significant overlap between the PP and LDPE fractions, resulting from the assumed distributions.

However, this density distribution overlap can be overcome by employing appropriate particle density/size modification techniques, as discussed below.

As assumed in the model calculations, the density distributions of the various plastic types will undoubtedly overlap to varying extents. Since the separation is based on density differences for particles of similar size, the LFBC alone cannot overcome an inherent density distribution overlap. This represents a potential limitation on the purity of the various plastic fractions that can be obtained. Fortunately, however, in addition to density, there are other physical property differences among the various plastics that can be effectively utilized to enhance LFBC performance.

For example, a staged approach can be adopted whereby a partially separated particle fraction from a primary LFBC is fed to a "polishing" unit where the separation could be improved by selectively modifying the size/density of particles of a particular plastic type. Particle modification techniques could also be applied in the primary LFBC as well.

One potentially attractive method for selectively modifying particle size/density is via temperature programming, taking advantage of the different thermal properties of the various plastic types, and/or possibly even within a plastic type due to variations in crystallinity, morphology, etc. All the plastics described herein are thermoplastics with melting points exceeding 100° C. Consequently, they can be subjected to thermal cycling without experiencing permanent degradation. Due to the nature of LFBC, the fluidizing water serves as an ideal heat transfer medium that can be well controlled. In that one objective of the process development is to minimize the use of additives, and hence reduce costs, this necessarily limits the operating temperature range to 0–100° C. (i.e., between the freezing and boiling points of the fluidizing medium, or water in this case). However, if desired the temperature range can be extended using, by example, well-known antifreeze additives.

The thermal conductivities of all of the plastics of interest herein are uniformly low. Consequently, the Biot number for heat transfer between plastic particles and water at typical liquid-fluidized bed conditions is considerably greater than unity (e.g., Bi~35 for 0.5 cm LDPE particles fluidized in water at 25° C., with $U_o$=1.5 cm/s). Therefore, particle temperature variation(s) (more particularly, internal particle temperature variations) are internally-controlled by the particle thermal diffusivity, $\alpha=k/\rho c_p$, where k is the thermal conductivity, $\rho$ the density, and $c_p$ the heat capacity of the plastic particles.

In accordance with the foregoing, the use of thermal modification has been found to be advantageous for the difficult-to-separate polyolefins. From their properties, $\alpha$~6.7×10$^{-4}$ cm$^2$/s for PP, while that of LDPE and HDPE are 1.6×10$^{-3}$ cm$^2$/s and 2.1×10$^{-3}$ cm$^2$/s, respectively, it can be appreciated that PE particles subjected to a sudden temperature variation will change size more rapidly than PP particles. For example, for 2.5 mm thick chips, PE particles will accommodate to a change in the water temperature in approximately 1.5 minutes (three times the characteristic time constant), whereas PP particles will require approximately 4.5 minutes.

Thus, in the case of downflow fluidization of the polyolefins fraction, particle shrinkage due to a sudden decrease in the temperature of the fluidizing water will cause PE particles to move further down the bed, thereby decreasing the density overlap of the two different types of particles, and improving separation.

It can be shown by analysis that the LFBC is sensitive to modest changes in particle density. A decrease in particle volume causes an increase in the particle density. For a spherical particle of density $\rho_p$ and diameter $d_p$, the sensitivity of the Galileo number to $\rho_p$ is $\partial[\ln(Ga)]/\partial[\ln(\rho_p)]=-\rho/(\rho-\rho_p)$ for particles lighter than the fluidization medium. A similar expression results for particles heavier than the fluidization medium by exchanging $\rho$ and $\rho_p$ in the denominator. Consequently, for particles of specific gravity 0.9 in water, a 3% variation in density (or a 1% variation in $d_p$) will cause approximately a 30% variation in Ga. Since the latter is roughly proportional to the terminal particle velocity (the exact dependence is a function of particle shape, flow regime, etc.), this has a considerable effect on the location of the particle in the LFBC, and, consequently, on particle segregation.

Figure 5:
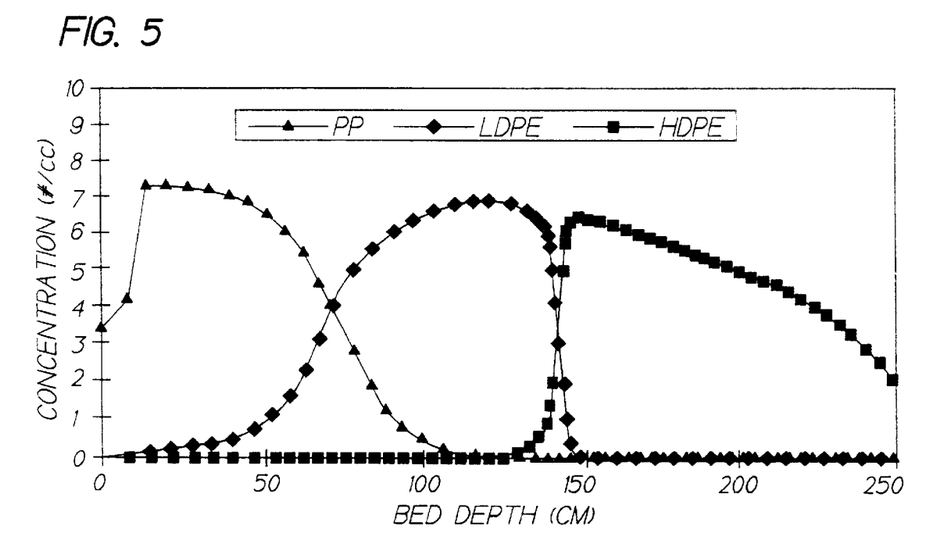
FIG. 5 is a graph showing the result of the numerical model that predicts LFBC performance and, in particular, depicts steady-state polyoelfin particle profiles in "downflow" LFBC at a fluidizing water temperature of 80° C. and a fluid velocity of 1.5 cm/s.

For the fluidized bed depicted in FIG. 5, with particles equilibrated to a water temperature of 80° C., decreasing the water temperature to 10° C. will cause approximately a 3% decrease in the volume of the PE particles more rapidly than for the PP particles. For the same fluidization velocity (slightly higher mass velocity), the bed will expand due to the increase in the kinematic viscosity of the water.

Figure 6:
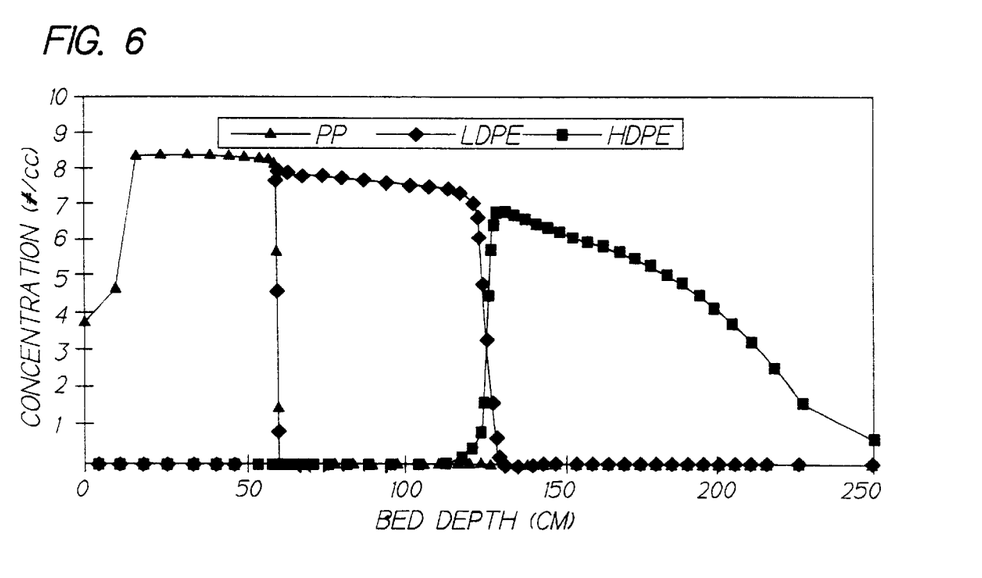
FIG. 6 is a graph showing the result of the numerical model that predicts LFBC performance and, in particular, depicts polyoelfin particle profiles in "downflow" LFBC at a fluidizing water temperature of 10° C. and a fluid velocity of 1.0 cm/sec.

As is shown in FIG. 6, the shift in the density distribution of the PE particles to high values due to particle shrinkage is sufficient to eliminate almost all the assumed density distribution overlap between the LDPE and PP particles. It is noted that in the graph of FIG. 6 the fluidization velocity was reduced to 1.0 cm/s in order to decrease bed expansion and to retain all the original particles in the bed for comparison.

It is noted that a similar favorable situation exists for the "heavier-than-water" pair, PS/PVC; i.e., $\alpha$ varies from 1.2× 10$^{-3}$ cm$^2$/s for rigid PVC to 7.0×10$^{-3}$ cm$^2$/s for plasticized PVC, and from 8.5×104 cm$^2$/s for general purpose polystyrene to 5.7×10$^{-4}$ cm$^2$/s for impact-resistant polystyrene.

Although it was shown in FIG. 4 that it may be possible to achieve a certain level of separation between PET and PVC particles, depending on their particular density distributions in a mixture, in general they represent a difficult pair to separate since their physical and thermal properties can be quite similar. However, typical glass transition temperatures, $T_g$, for PET are generally lower (69–73° C.) than for PVC (87° C.). In general, the volume expansivity of a polymer experiences a discontinuous increase at the second order phase transition at $T_g$. Consequently, for a fluidizing water temperature, T, such that $T_g(PET)<T<T_g(PVC)$, it has been determined that PET particles originally of the same density as PVC particles will expand to a greater degree than PVC particles, thereby moving higher and separating from PVC particles in an upward flow, water-fluidized bed.

For those separations that are amenable to thermal enhancement, it is possible that a single thermal cycle may be insufficient to completely "break" an overlap of density distributions. In such cases, however, repeated thermal cycling has been found to improve the separation considerably, since the relaxation time scale for reverting to the original particle distributions is on the order of the classification velocity, which is typically quite small in regions between adjacent particle fractions. This approach is directly analogous to parametric pumping and cycling zone adsorption separation processes in fixed bed adsorbers using temperature cycling.

Another technique for eliminating a density distribution overlap is by swelling of particular polymer types in appropriate "marginal" solvents or water solutions (i.e., solvents or solutions that swell or alter the density of a polymer, but do not dissolve it). Such agents are extensively tabulated for most plastics of interest in terms of chemical compatibility. By choosing a solvent (or aqueous additive, such as an acid or a base) that acts on only one type or class of plastics, the size/density of only selected particles is altered. As has been shown above, separation in the LFBC can be quite sensitive to such changes, which thus offers an opportunity "fine-tuning" the desired separation.

The selection of suitable solvents can be guided by consideration of the solubility parameters or hydrogen bonding indices for specific plastics. For example, at room temperature, hexane or ethyl acetate are potential choices for swelling polystyrene. At slightly elevated temperatures, alkanes are candidates for swelling polypropylene and polyethylene. Even a "strong" solvent (i.e., one that dissolves the polymer) might be considered in some applications, since the contact time can be controlled to be considerably less than the time required for dissolution. The combination of temperature and solvent type can also be used to selectively swell plastic particles of a particular type; this is, certain solvents that are ineffective for swelling particular plastics at low temperatures, become effective at elevated temperatures.

The targeted particles may be exposed to the swelling agent after disengaging the appropriate fraction from the primary LFBC. The relative rates of swelling or solution imbibation of different types of plastic may, in fact, also give an added measure of separation. That is, certain particle types may be affected quite rapidly, whereas other particle types will do so more slowly (feeding the particles to a second stage of LFBC prior to equilibration of the slowly changing fraction can be employed to make the separation event more efficient).

Although there may be some operationally-related considerations concerning use of certain solvents or additives, the fluidization could still take place in water. Also, and regardless of what swelling agent is used, the swelling agent is preferably recycled, such as by a gravity separation of (immiscible) excess solvent and water, or, if necessary, a separation appropriate for miscible mixtures (e.g., flash distillation or liquid extraction). Also, proper account should be taken of the relative kinetics of leaching the swelling agent into the fluidizing medium vs. separation. In addition, the end use of the recovered plastics should be consistent with exposure to whatever solvents or aqueous additives are involved.

As has been described above, the LFBC process of this invention can make use of water, which is already in general use in the plastic waste washing and grinding operation. Furthermore, the process operates at atmospheric pressure and at ambient (or near ambient) temperatures. The process also makes use of waste solids in chip or flake form, which are already produced in some waste handling operations (e.g., plastics). In addition, the LFBC process can operate on all types of waste solid particles by using sieved fractions and can be run in a continuous or semi-continuous manner, thereby lending itself well to automation.

Furthermore, the LFBC process in accordance with this invention is compatible and complementary with other solids handling/size separation processes, such as sieving, sedimentation, differential flotation, and hydraulic transport. The degree of separation can be tailored to a wide range of particular separations requirements by staging or by using secondary polishing units.

Figure 7:
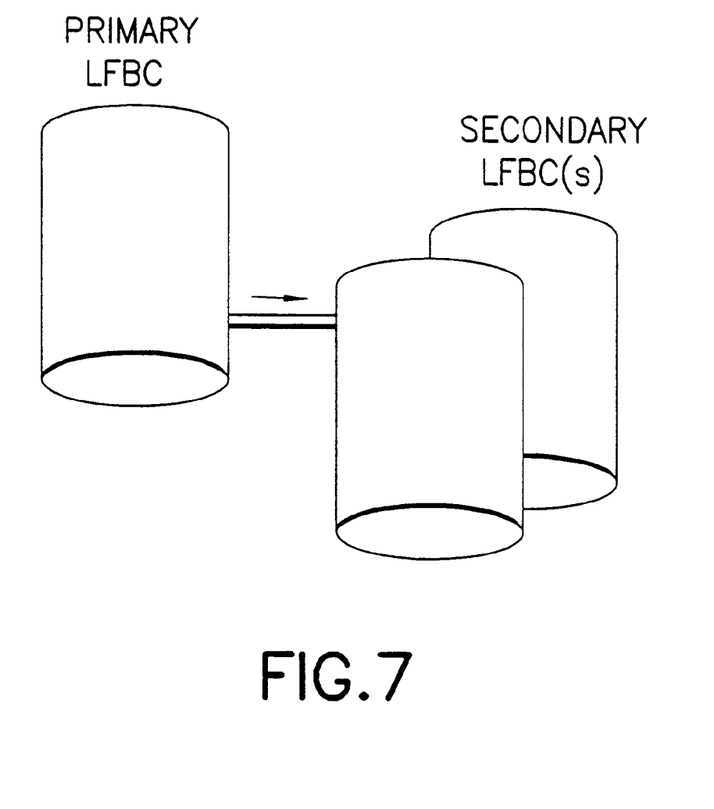
FIG. 7 is a block diagram showing first and second LFBCs that are coupled together.

If It is within the scope of this invention that preliminary or rough sorting of solid waste particles into glass, metal, and plastics can be achieved in a primary LFBC, followed by finer separations in secondary LFBCs operating on, by example, the plastics fraction (e.g., see FIG. 7). The LFBC process of this invention is also scalable to accommodate a wide range of operations, either by employing larger or small columns, or multiple columns.

Particularly with respect to waste plastics, the LFBC process of this invention is flexible in terms of the types of plastics that can be accommodated, including those which are both heavier and lighter than water. In addition, intrinsic density distribution overlap of the various waste plastic types can be overcome via particle size/density modification techniques, such as thermal cycling and/or polymer swelling methods.

In addition to the applications enumerated above, there are also a number of other applications for the LFBC process in existing waste plastics recycling operations. For example, in sorting applications involving the recycling of PET plastic containers, the separation between aluminum and PET is of special interest since the heavy fractions from hydroclone and flotation separation steps in more processes typically include both PET and aluminum flakes from bottle caps. Further separation is usually accomplished electrostatically. Given the difference in the densities of the two materials, the LFBC process is capable of producing aluminum and PET fractions which are almost completely uncontaminated by one another, thereby significantly reducing or totally eliminating a need for air classifiers, electrostatic separators, hydroclones, and even washers.

By example, the LFBC separation process of this invention can be combined with washing by adding a detergent to the fluidizing water. In this manner, and by example, adhesives used for the labels and base cup of PET bottles, which are among the most troublesome PET contaminants, are separated and carried away with the wash/fluidizing water. The remaining PET and aluminum flakes then segregate in the LFBC and can be withdrawn by hydraulic flow from the appropriate column sections. The same basic techniques can also be applied to the separation of durables plastics from other components; e.g., "fluff", metals, etc.

Although described in the context of vertically disposed column that employs water as a fluidizing medium, it should be appreciated that the column need not be exactly perpendicular to the local normal for the process to occur. It should be further appreciated that other fluidizing mediums can be used, although water will generally be the least expensive.

Thus, while the invention has been particularly shown and described with respect to preferred embodiments thereof, it will be understood by those skilled in the art that changes in form and details may be made therein without departing from the scope and spirit of the invention.

What is claimed is:

1. A method for separating a sample of solid waste material into its constituent parts, comprising the steps of:
    providing the solid waste material in a particulate form having a plurality of different particulate types;
    loading the provided solid waste material into a column of a liquid-fluidized bed classifier (LFBC); and
    pumping a flow of liquid through the column for separating the waste particulates into multiple, well-separated fractions, within the same column and employing only water as a fluidizing medium, based in part on the densities of the plurality of different particulate types of the solid waste material.

2. A method as set forth in claim 1 and further comprising a step of withdrawing at least one fraction from the column.

3. A method as set forth in claim 2 and further comprising the steps of:
  introducing the withdrawn fraction into a column of a second LFBC; and
  pumping a flow of liquid through the column of the second LFBC for separating the particulates of the fraction into sub-fractions.

4. A method as set forth in claim 1 wherein the solid waste material is comprised of a plurality of different types of plastics individual ones of which form one of said plurality of particulate types.

5. A method as set forth in claim 4 wherein the step of pumping includes a step of varying a temperature of the fluid.

6. A method as set forth in claim 1 wherein the step of pumping includes a step of introducing an additive to the fluid, the additive being selected to cause a change in size/density of at least one type of particulate with respect to that of other types of particulates.

7. A method as set forth in claim 1 wherein the step of pumping includes a step of adding a detergent to the fluid such that the particulates are simultaneously washed and separated.

8. A method for separating a sample of solid waste material into its constituent parts, comprising the steps of:
  providing the solid waste material in a particulate form having a plurality of different particulate types;
  loading the provided solid waste material into a column of a liquid-fluidized bed classifier (LFBC); and
  pumping a flow of liquid through the column for separating the waste particulates into multiple, well-separated fractions, within the same column and employing only water as a fluidizing medium, based in part on the densities of the plurality of different particulate types of the solid waste material;
  wherein the fluid includes at least one additive selected for changing at least one of a freezing point and a boiling point of the fluid, and wherein the step of pumping includes a step of varying a temperature of the fluid so as to be below a normal freezing point or above a normal boiling point and to thereby increase size/density differences between individual ones of said plurality of particulate types.

9. A method for separating heterogeneous solid plastic waste material into at least two substantially homogeneous fractions each comprising substantially only one type of plastic, comprising the steps of:
  providing the solid plastic waste material in a particulate form having a plurality of different types of plastic particulates;
  loading the provided solid plastic waste material into a column of a liquid-fluidized bed classifier (LFBC); and
  pumping a flow of liquid through the column for separating the solid plastic waste particulates into at least two fractions based in part on the densities of the different types of plastic particulates that comprise the solid plastic waste material.

10. A method as set forth in claim 9 and further comprising a step of withdrawing at least one fraction from the column.

11. A method as set forth in claim 10 and further comprising the steps of:
  introducing the withdrawn fraction into a column of a second LFBC; and
  pumping a flow of liquid through the column of the second LFBC for separating the particulates of the fraction into sub-fractions.

12. A method as set forth in claim 9 wherein the solid plastic waste material also includes metallic waste material, and wherein the step of pumping also separates the metallic waste material from the plastic waste material.

13. A method as set forth in claim 9 wherein the step of pumping includes a step of introducing an additive to the fluid, the additive being selected to cause a change in size/density of at least one type of plastic particulate with respect to the density of other types of plastic particulates.

14. A method as set forth in claim 9 wherein the step of pumping includes a step of adding a detergent to the fluid such that the plastic particulates are simultaneously washed and separated.

15. A method as set forth in claim 9, and further comprising, during the step of pumping, the steps of:
  withdrawing at least one fraction from the column of the LFBC; and
  loading additional solid plastic waste material into the column of the LFBC.

16. A method as set forth in claim 9, and further comprising the steps of:
  terminating the pumping of the flow of liquid through the column, thereby collapsing the fluidized bed into at least two distinct fractions each comprised of a different type of plastic; and
  removing the at least two distinct fractions from the column.

17. A method as set forth in claim 9, wherein the step of pumping is accomplished by at least one of continuously pumping and periodically pumping.

18. A method as set forth in claim 9, wherein the particulates of each of the types of plastics have a size/density distribution, wherein there is an overlap of size/density distributions between the particulates of at least two of the types of plastics, and further including a step of modifying the size/density distribution of the particulates of at least one of the types of plastics so as to reduce or eliminate the overlap.

19. A method for separating heterogeneous solid plastic waste material into at least two substantially homogeneous fractions each comprising substantially only one type of plastic, comprising the steps of:
  providing the solid plastic waste material in a particulate form having a plurality of different types of plastic particulates;
  loading the provided solid plastic waste material into a column of a liquid-fluidized bed classifier (LFBC); and
  pumping a flow of liquid through the column for separating the solid plastic waste particulates into at least two fractions based in part on the densities of the different types of plastic particulates that comprise the solid plastic waste material;
  wherein the step of pumping includes a step of varying a temperature of the fluid for selectively modifying a size/density of at least one type of plastic particulate so as to further separate the at least one type of plastic particulate from another type of plastic particulate having a similar size/density.

20. A method for separating heterogeneous solid plastic waste material into at least two substantially homogeneous fractions each comprising substantially only one type of plastic, comprising the steps of:

providing the solid plastic waste material in a particulate form having a plurality of different types of plastic particulates;

loading the provided solid plastic waste material into a column of a liquid-fluidized bed classifier (LFBC); and pumping a flow of liquid through the column for separating the solid plastic waste particulates into at least two fractions based in part on the densities of the different types of plastic particulates that comprise the solid plastic waste material;

wherein the fluid includes at least one additive selected for changing at least one of a freezing point and a boiling point of the fluid, and wherein the step of pumping includes a step of varying a temperature of the fluid so as to be below a normal freezing point or above a normal boiling point and to thereby increase size/density differences between individual ones of said plurality of particulate types.

21. A system for separating heterogeneous solid plastic waste material into at least two substantially homogeneous fractions each comprising substantially only one type of plastic, comprising:

at least one liquid-fluidized bed classifier (LFBC) comprising a column for holding a quantity of the solid plastic waste material in a particulate form having a plurality of different plastic particulate types;

means for selectively flowing a flow of liquid through the column from top to bottom or from bottom to top for separating the solid plastic waste particulates into at least two fractions based on the densities of the different types of plastics that comprise the solid plastic waste material and also on the sizes of the plastic particulates; and means for extracting a separated fraction from the column.

22. A system as set forth in claim 21 and further comprising means for varying a temperature of the fluid that is flowed through the column, the temperature of the fluid being used at least in part to control the constituent particulate type within at least one of the fractions.

23. A system as set forth in claim 21 wherein the fluid that is flowed through the LFBC contains at least one additive, the at least one additive being selected to cause a change in size/density of at least one type of plastic particulate with respect to the size/density of other types of plastic particulates for controlling the constituent particulate type within at least one of the fractions.

24. A method as set forth in claim 21, wherein said means for selectively flowing causes a flow of fluidizing liquid through the column from top to bottom for a bed of particulates having densities less than said fluidizing liquid, or from bottom to top for a bed of particulates having densities greater than said fluidizing liquid.

25. A system for separating heterogeneous solid plastic waste material into at least two substantially homogeneous fractions each comprising substantially only one type of plastic, comprising:

at least one liquid-fluidized bed classifier (LFBC) comprising a column for holding a quantity of the solid plastic waste material in a particulate form having a plurality of different plastic particulate types;

means for selectively flowing a flow of liquid through the column from top to bottom or from bottom to top for separating the solid plastic waste particulates into at least two fractions based on the densities of the different types of plastics that comprise the solid plastic waste material and also on the sizes of the plastic particulates; and means for extracting a separated fraction from the column;

wherein the fluid includes at least one additive selected for changing at least one of a freezing point and a boiling point of the fluid, and further comprising means for varying a temperature of the fluid that is pumped through the LFBC so as to be below a normal freezing point or above a normal boiling point and to thereby increase size/density differences between individual ones of said plurality of plastic particulate types.

26. A method for separating heterogeneous solid plastic material into at least two substantially homogeneous fractions each comprising substantially only one type of plastic, comprising the steps of:

providing the solid plastic material in a particulate form having a plurality of different types of plastic particulates;

loading the provided solid plastic material into a column of a liquid-fluidized bed classifier (LFBC); pumping a flow of water through the column from top to bottom or from bottom to top; and separating the solid plastic particulates into at least two fractions based in part on the densities of the different types of plastic particulates that comprise the solid plastic waste material;

wherein the step of separating includes a step of at least one of chemically or thermally varying a size/density of at least one first type of plastic particulate with respect to that of at least one second type of plastic particulate so as to enhance the separation of the first and second types of plastic particulates.

27. A method for separating heterogeneous, lighter than water solid plastic material into at least two substantially homogeneous fractions each comprising substantially only one type of plastic, comprising the steps of:

providing the solid plastic material in a particulate form having a plurality of different types of plastic particulates;

loading the provided solid plastic material into a column of a liquid-fluidized bed classifier (LFBC);

pumping a flow of water through the column from top to bottom; and separating the solid plastic particulates into at least two fractions based in part on the densities of the different types of plastic particulates that comprise the solid plastic material.

28. A method as set forth in claim 27, wherein the step of separating includes a step of at least one of chemically or thermally varying a size/density of at least one first type of plastic particulate with respect to that of at least one second type of plastic particulate so as to enhance the separation of the first and second types of plastic particulates.

29. A method as set forth in claim 27, wherein said lighter than water plastic material is comprised of at least two different polyolefins.

* * * * *